(12) United States Patent
Oouchi et al.

(10) Patent No.: US 11,841,499 B2
(45) Date of Patent: Dec. 12, 2023

(54) OPTICAL ELEMENT AND IMAGING LENS

(71) Applicant: TOKYO VISIONARY OPTICS CO., LTD., Tokyo (JP)

(72) Inventors: Tatsuya Oouchi, Sukagawa (JP); Shigeru Endo, Sukagawa (JP)

(73) Assignee: TOKYO VISIONARY OPTICS CO., LTD., Tokyo (JP)

( * ) Notice: Subject to any disclaimer, the term of this patent is extended or adjusted under 35 U.S.C. 154(b) by 126 days.

(21) Appl. No.: 17/368,480

(22) Filed: Jul. 6, 2021

(65) Prior Publication Data

US 2021/0333544 A1    Oct. 28, 2021

Related U.S. Application Data

(63) Continuation of application No. 16/421,038, filed on May 23, 2019, now abandoned.

(30) Foreign Application Priority Data

May 23, 2018  (JP) ................. 2018-099067

(51) Int. Cl.
*G02B 27/00* (2006.01)
*G02B 13/00* (2006.01)

(52) U.S. Cl.
CPC ......... *G02B 27/00* (2013.01); *G02B 13/0045* (2013.01); *G02B 27/0018* (2013.01)

(58) Field of Classification Search
None
See application file for complete search history.

(56) References Cited

U.S. PATENT DOCUMENTS

| | | |
|---|---|---|
| 2011/0158633 A1 | 6/2011 | Lai |
| 2018/0348479 A1 | 12/2018 | Kasama |
| 2019/0049737 A1* | 2/2019 | Terai .................. G02B 27/0955 |

FOREIGN PATENT DOCUMENTS

| | | | |
|---|---|---|---|
| CN | 103900023 A | 7/2014 | |
| EP | 2422746 B1 * | 7/2017 | ............... A61F 2/14 |
| EP | 2422746 B1 | 7/2017 | |
| JP | S59-152401 A | 8/1984 | |

* cited by examiner

*Primary Examiner* — Stephone B Allen
*Assistant Examiner* — Tamara Y. Washington
(74) *Attorney, Agent, or Firm* — Hamre, Schumann, Mueller & Larson, P.C.

(57) ABSTRACT

An object is to provide an optical element and an imaging lens that reproduce clear images by restraining ghosting, flare, and/or similar occurrences caused by unwanted light reflected by the outer circumference surface of an edge of the optical element. An optical element 100 includes an optical effective portion 101 and an edge 102. The edge 102 is located around the optical effective portion 101 and has an outer circumference surface 103. The outer circumference surface 103 includes roughened portions 200. An imaging lens uses the optical element 100.

11 Claims, 6 Drawing Sheets

FIG. 1

Cross-Section: A-A'

OPTICAL ELEMENT AND IMAGING LENS

CROSS-REFERENCE TO RELATED APPLICATIONS

The present application claims priority under 35 U.S.C. § 119 to Japanese Patent Application No. 2018-099067, filed May 23, 2018. The contents of this application are incorporated herein by reference in their entirety.

BACKGROUND OF THE INVENTION

Field of the Invention

The present invention relates to an optical element used in an imaging device and relates to an imaging lens using the optical element.

Discussion of the Background

In recent years, a variety of products such as information terminals have been equipped with camera functions.

For cameras built in these information terminals, there is a need for imaging lenses capable of taking clear images, with eliminated or minimized ghosting and flare. In order to eliminate or minimize ghosting and flare, it is important to restrain unwanted light, which does not contribute to image formation.

Patent documents 1 and 2 disclose techniques to restrain unwanted light.

Patent document 1 discloses an optical element incorporated in a photographing optical system. The optical element includes an effective diameter area, an outside effective diameter area, and an outer circumference surface. The effective diameter area is centered around a photographing optical axis, and permits an effective light flux that contributes to image formation to pass through the effective diameter area. The outside effective diameter area surrounds the effective diameter area. The outer circumference surface surrounds the outside effective diameter area. At least a part of the outer circumference surface in its thickness direction or circumferential direction is a non-parallel surface having an angle relative to the photographing optical axis. When a ray of light enters the optical element through the object-side surface of the optical element and is reflected on the image-side surface of the optical element to become incident on and reflected by the outer circumference surface, the non-parallel surface prevents the reflected ray of light from becoming incident on the image side of the optical element.

Patent document 2 discloses a lens unit that includes a photographing optical system and a photographing optical system holder. The photographing optical system includes a plurality of optical elements and forms an optical image of an object. The photographing optical system holder holds the photographing optical system. At least one optical element among the plurality of optical elements includes an effective region portion, a non-effective region portion, an engagement depression or an engagement protrusion, and a scattering portion. The effective region portion permits a light flux from an object to pass through the effective region portion. The non-effective region portion surrounds the effective region portion in an orthogonal direction orthogonal to an optical axis of the photographing optical system. The engagement depression or the engagement protrusion is located between the effective region portion and the non-effective region portion in the orthogonal direction, and is engaged with an adjacent optical element so that the optical axis of the at least one optical element and the optical axis of the adjacent optical element coincide. The scattering portion is located on the outer circumference surface of the non-effective region portion and scatters light. The term scattering portion is recognized as: "The scattering portion is an embossed layer formed by roughening the outer circumference surface of the non-effective region portion. The embossed layer has a surface roughness of equal to or less than approximately 10 µm, in ten-point average roughness, preferably approximately 4 to 6 µm. Surfaces having the specified surface roughnesses can be formed using a roughness die such as #1003, available from AYAMADAI CO., LTD." (see paragraph [0033] of patent document 2).

RELATED ART DOCUMENTS

Patent Documents

[Patent document 1] JP 2010-164755A
[Patent document 2] JP 2015-90484A

Problems to be Solved by the Invention

In the optical element recited in patent document 1, at least a part of the outer circumference surface in its thickness direction or circumferential direction is a non-parallel surface having an angle relative to the photographing optical axis. With this configuration, the object of patent document 1 is to control reflection light away from the imaging element side. This optical element, however, provides no or little effect of attenuating the power of reflection light, and thus is insufficient in restraining unwanted light occurring in the imaging lens.

In an attempt to attenuate the power of reflection light, the imaging lens recited in patent document 2 has an embossed layer to scatter light on the outer surface of the imaging lens, in addition to having the configuration of the optical element recited in patent document 1. However, the mere formation of an embossed layer is insufficient for restraining unwanted light, which does not contribute to image formation.

The present invention has been made in light of the above-described circumstances, and has an object to sufficiently restrain unwanted light, which does not contribute to image formation, by providing the outer circumference surface of an optical element with a shape that sufficiently restrains reflection light. The present invention also has an object to provide an imaging lens using the optical element.

SUMMARY OF THE INVENTION

In order to accomplish the above-described object, an optical element according to an embodiment of the present invention includes an optical effective portion and an edge. The edge is located around the optical effective portion and has an outer circumference surface. The outer circumference surface includes a roughened portion.

In order to accomplish the above-described object, an imaging lens according to an embodiment of the present invention includes optical element having the following configuration. The optical element includes an optical effective portion and an edge. The edge is located around the optical effective portion and has an outer circumference surface. The outer circumference surface includes a plurality of roughened portions.

Effects of the Invention

The embodiments of the present invention ensure that when light in the optical element becomes incident on and reflected by the outer circumference surface, the plurality of roughened portions attenuate the power of the light sufficiently for restraining ghosting and flare.

BRIEF DESCRIPTION OF THE DRAWINGS

A more complete appreciation of the present invention and many of the attendant advantages thereof will be readily obtained as the same becomes better understood by reference to the following detailed description when considered in connection with the accompanying drawings, wherein.

In the optical element according to the embodiment of the present invention, the outer circumference surface of the edge formed around the optical effective portion of the optical element includes a roughened portion. The roughened portion attenuates unwanted light reflected by the outer circumference surface of the optical element.

The embodiments of the present invention will be described in detail below by referring to FIGS. 1 to 7.

Figure 1:
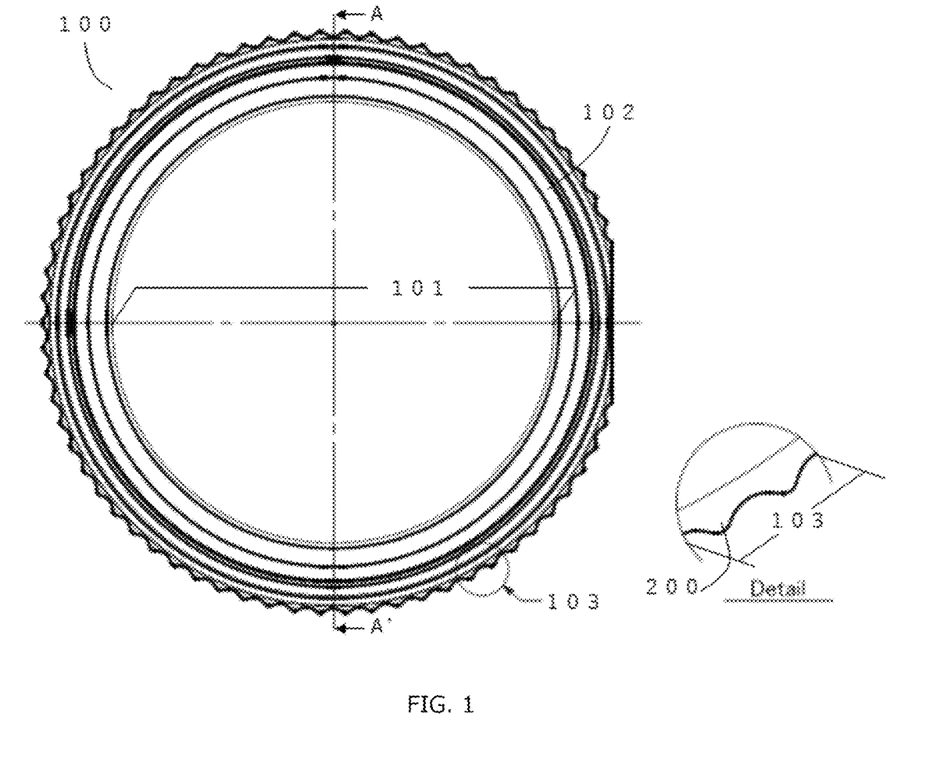
FIG. 1 is a schematic illustrating an optical element according to an embodiment of the present invention.

FIG. 1 illustrates the optical element according to one embodiment of the present invention.

As illustrated in FIG. 1, an optical element 100 includes an optical effective portion 101 and an edge 102. The optical effective portion 101 is where effective rays of light enter. The edge 102 is formed around the optical effective portion 101 and integral to the optical effective portion 101. The edge 102 has an outer circumference surface 103. The outer circumference surface 103 includes a plurality of roughened portions 200.

Figure 2:
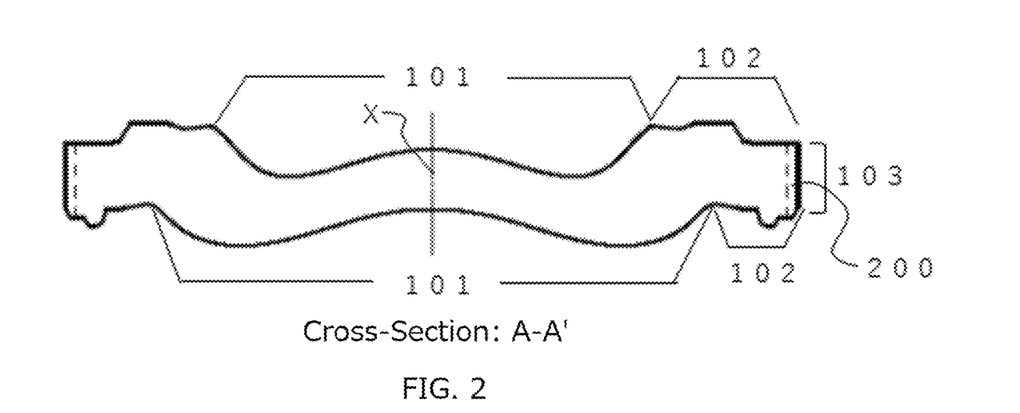
FIG. 2 is a cross-sectional view of the optical element according to the embodiment of the present invention.

FIG. 2 is a cross-sectional view of the optical element 100 taken along A-A' illustrated in FIG. 1.

As illustrated in FIG. 2, the roughened portions 200 of the outer circumference surface 103 extend in parallel to the direction in which the optical axis, X, of the optical element 100 extends. It is to be noted that the roughened portions 200 may extend with an angle relative to the optical axis X.

Figure 3:
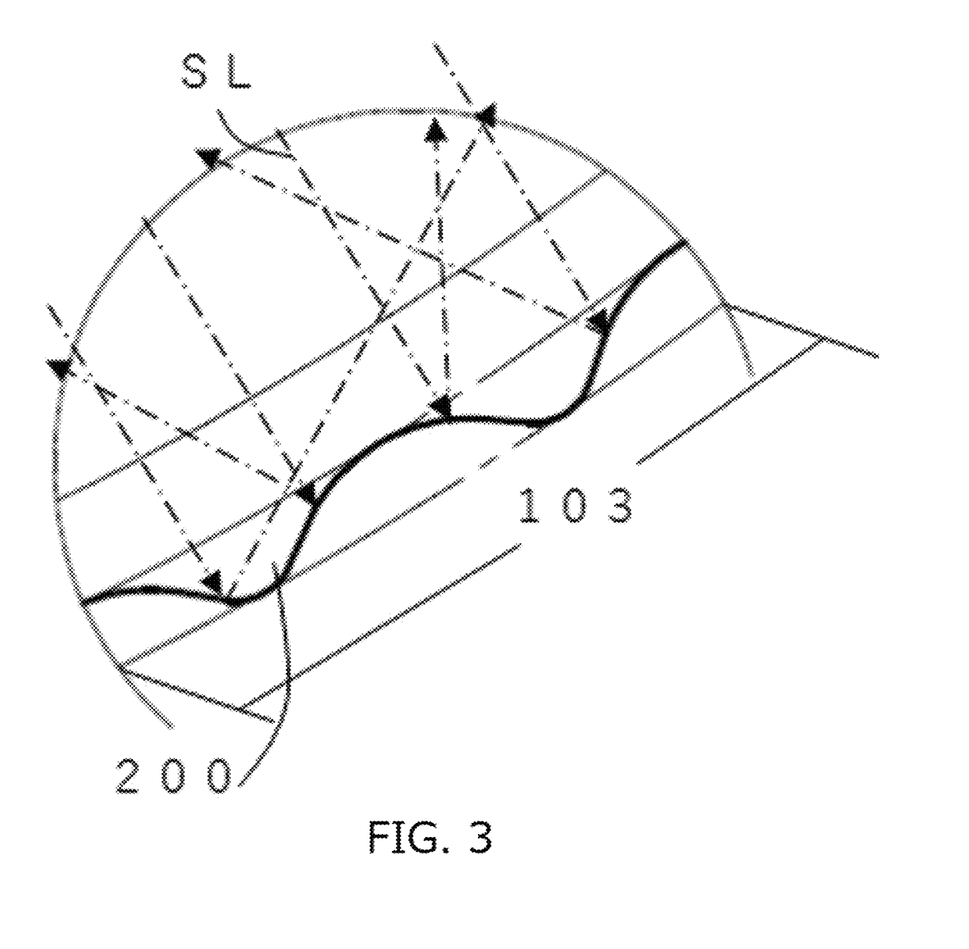
FIG. 3 is a schematic illustrating a behavior of unwanted light on roughened portions of an outer circumference surface of the optical element.

FIG. 3 illustrates a behavior of a ray of light SL incident on the roughened portions 200 of the outer circumference surface 103.

As illustrated in FIG. 3, when the ray of light SL becomes incident on the roughened portions 200 of the outer circumference surface 103, the ray of light SL turns into scattered light with attenuated light power.

Details of the shape of each roughened portion 200 may be set using ghosting simulation software to form a shape that highly accurately controls the directions in which the ray of light SL is reflected. That is, an analysis for restraining ghosting and flare can be performed at the design stage.

This eliminates or minimizes the need for the conventional trial-and-error type of procedure that involves: evaluating the occurrence of ghosting and flare after an imaging lens has been assembled; analyzing the ghosting and flare for the cause of the ghosting and flare; and feeding the analysis back to the design stage.

Also, forming a roughened shape to scatter light is more effective for restraining ghosting and flare than the mere formation of an embossed layer.

It is preferable, therefore, to form an embossed layer on the surfaces of the roughened portions 200 of the outer circumference surface 103.

Figure 4:
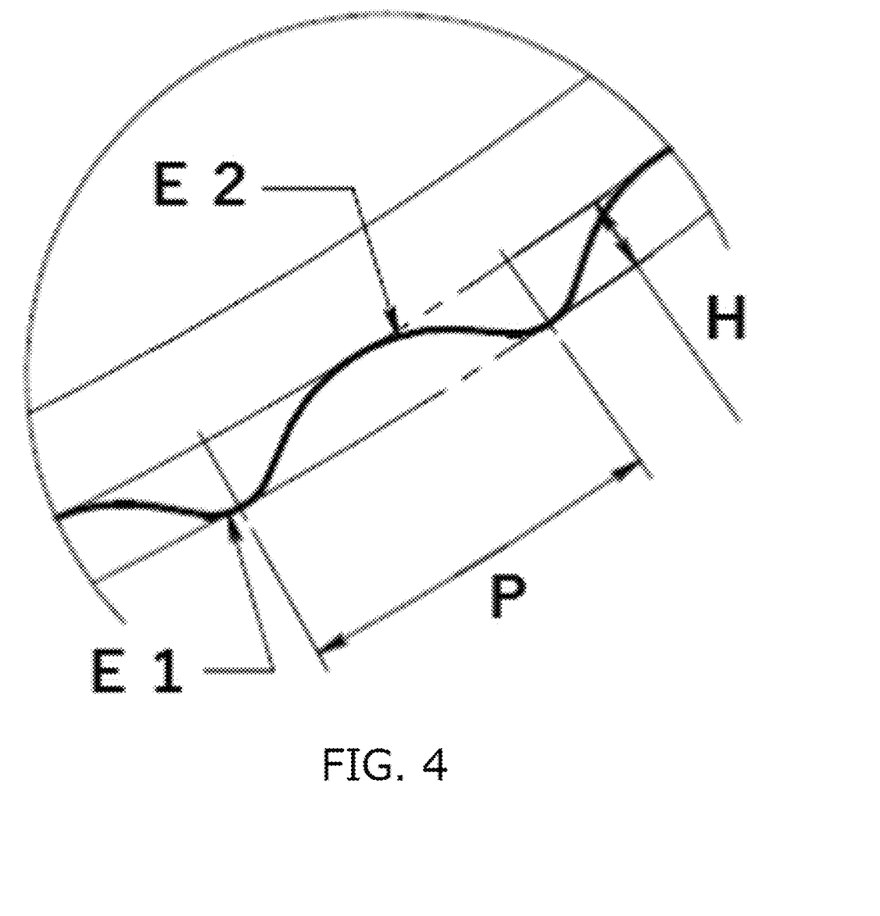
FIG. 4 is an enlarged view of part (103) illustrated in FIG. 1, illustrating one embodiment of the roughened portion.

FIG. 4 illustrates one embodiment of a shape of the roughened portion 200. In this embodiment, the roughened portion 200 has a height H of 0.065 mm; an edge portion E1 of an arcuate protrusion of the roughened portion 200 has a radius (R) of R 0.05 mm; and an edge portion E2 of an arcuate depression of the roughened portion 200 has a radius (R) of R 0.15 mm. The roughened portion 200 thus dimensioned has a unit shape made up of a protrusion and a depression, and a repetition of 72 unit shapes is formed over the entire circumference of the outer circumference surface of the edge (at a pitch P of 5° (degrees) relative to the optical axis X).

It is to be noted that the shape of the roughened portion 200 will not be limited to the above-described dimension values. The roughened portion 200 may have any other shape insofar as, preferably, the height H is equal to or more than 0.01 mm, the edge portion E1 of the protrusion of roughened portion 200 has a radius (R) of equal to or more than 0.03 mm, and the edge portion E2 of the depression of roughened portion 200 has a radius (R) of equal to or more than 0.03 mm. Also, the roughened portions 200 may be formed partially on the outer circumference surface of the edge, that is, at necessary portions of the outer circumference surface of the edge such that the repetition of the protrusion-depression unit shapes is equal to or more than ten (the pitch P is equal to or less than 36° (degrees) relative to the optical axis X).

Figure 5:
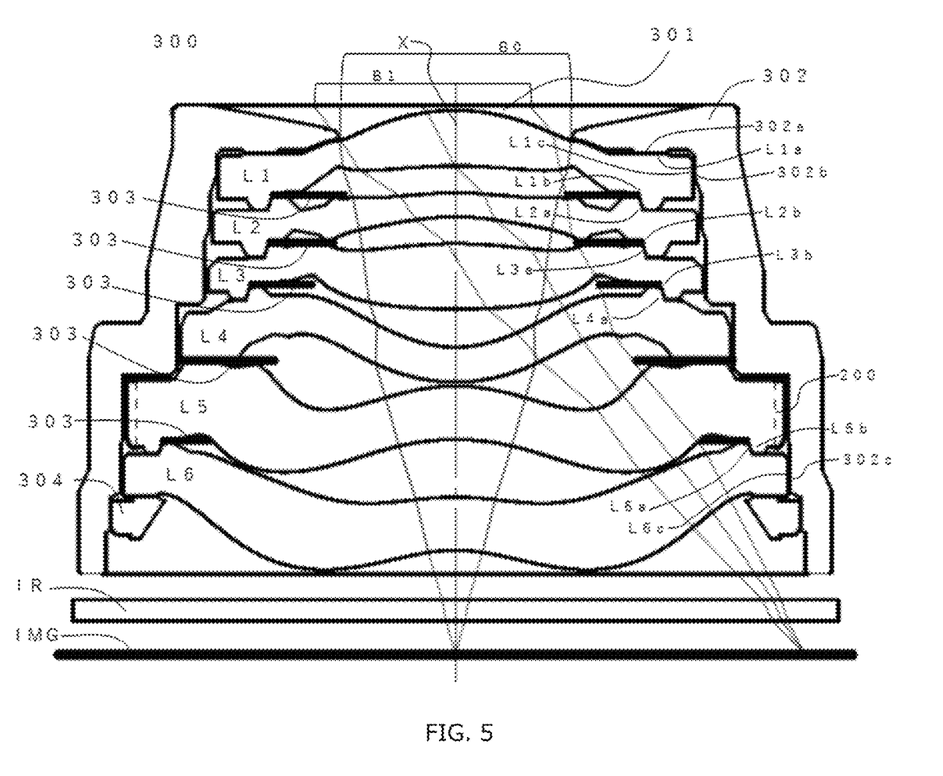
FIG. 5 is a cross-sectional view of one embodiment of an imaging lens structure to which the optical element according to the embodiment of the present invention is applied.

FIG. 5 illustrates one embodiment in which the optical element 100 is applied to an imaging lens 300, which is made up of six optical elements. In this embodiment, the optical element 100 is applied to one of the six optical elements.

As illustrated in FIG. 5, the imaging lens 300 includes a barrel 302, a first lens L1, a second lens L2, a third lens L3, a fourth lens L4, a fifth lens L5, a sixth lens L6, and a rear light-shielding ring 304. The first lens L1, the second lens L2, the third lens L3, the fourth lens L4, the fifth lens L5, the sixth lens L6, and the rear light-shielding ring 304 are contained in the barrel 302 in this order from the object side (from the upper side of FIG. 5) toward the side of imaging element IMG (toward the lower side of FIG. 5).

A light shielding plate 303 is located between the first lens L1 and the second lens L2; a light shielding plate 303 is located between the second lens L2 and the third lens L3; a light shielding plate 303 is located between the third lens L3 and the fourth lens L4; a light shielding plate 303 is located between the fourth lens L4 and the fifth lens L5; and a light shielding plate 303 is located between the fifth lens L5 and the sixth lens L6.

The rear light-shielding ring 304 is a member that fixes the first to sixth lenses L1 to L6 in the optical axis X direction and that is fixed by welding to the inner surface of the barrel 302 using a solvent such as methyl acetate. It is to be noted that the method of fixing the rear light-shielding ring 304 to the barrel 302 will not be limited to welding, other examples including bonding, press fitting, and a combination of the foregoing.

Also, the material of the lens constituting each of the optical elements is an optical-purpose resin such as cycloolefin polymer and polycarbonate. Also, the optical elements are formed by injection molding.

The imaging lens 300 is applicable to, for example, small-size imaging lenses used in mobile phones and smartphones. A filter IR to cut infrared light is disposed at the imaging element IMG side of the imaging lens 300. Next to the filter IR, the imaging element IMG is disposed. Examples of the imaging element IMG include, but are not limited to, a CCD sensor and a C-MOS sensor. Thus, the imaging lens 300, the filter IR, and the imaging element IMG are packaged into a camera module.

Each of the lenses has an optical effective portion (lens portion) and an edge formed around the optical effective portion. The edge of each lens has a protrusion engaged with an adjacent lens. The protrusion has an approximately trapezoid shape that includes a conical inclined surface and a plane portion connected to the inclined surface.

Next, how the imaging lens 300 is structured will be described.

A plane portion L1a of the edge of the first lens L1 is brought into contact with a receiving surface 302a. The receiving surface 302a is formed on the inner surface of the barrel 302 and is perpendicular to the optical axis X. In this manner, the position of the first lens L1 in the optical axis X direction is determined.

Also, an outer surface L1c of the first lens L1 is brought into engagement with an inner diameter portion 302b of the barrel 302. In this manner, the first lens L1 and the barrel 302 are subjected to axis alignment such that the first lens L1 and the barrel 302 are aligned with each other on the optical axis X.

Next, an inclined surface L I b of the first lens L1 is brought into engagement with an inclined surface L2a of the second lens L2. In this manner, the first lens L1 and the second lens L2 are subjected to axis alignment such that the first lens L1 and the second lens L2 are aligned with each other on the optical axis X.

Next, an inclined surface L2b of the second lens L2 is brought into engagement with an inclined surface L3a of the third lens L3. In this manner, the second lens L2 and the third lens L3 are subjected to axis alignment such that the second lens L2 and the third lens L3 are aligned with each other on the optical axis X.

Next, an inclined surface L3b of the third lens L3 is brought into engagement with an inclined surface L4a of the fourth lens L4. In this manner, the third lens L3 and the fourth lens L4 are subjected to axis alignment such that the third lens L3 and the fourth lens L4 are aligned with each other on the optical axis X.

Next, an inclined surface 5b of the fifth lens L5 is brought into engagement with an inclined surface L6a of the sixth lens L6. In this manner, the fifth lens L5 and the sixth lens L6 are subjected to axis alignment such that the fifth lens L5 and the sixth lens L6 are aligned with each other on the optical axis X.

Next, an outer surface L6c of the sixth lens L6 is brought into engagement with an inner diameter portion 302c of the barrel 302. In this manner, the sixth lens L6 and the barrel 302 are subjected to axis alignment such that the sixth lens L6 and the barrel 302 are aligned with each other on the optical axis X.

In the above-described structure of the imaging lens 300, a lens assembly 301 results with such a structure that the centers of the first to sixth lenses L1 to L6 are aligned with each other on the optical axis X and that the center of the barrel 302 is aligned with the centers of the first to sixth lenses L1 to L6 on the optical axis X.

Also in the above-described structure of the imaging lens 300, the first to fourth lenses L1 to L4 and the fifth and sixth lenses L5 and L6 each have a protrusion at the edge of each lens. The protrusion includes an inclined surface and a plane portion connected to the inclined surface. The plane portion is in contact with the plane portion of the edge of an adjacent lens. The contact between the plane portions determines the gap between one lens and an adjacent lens. It is to be noted that the gap between the fourth lens L4 and the fifth lens L5 is determined by the thickness of the light shielding plate 303.

Thus, the centers of the lenses of the lens assembly 301 are brought into alignment with each other on the optical axis X by the mere superposition of the lenses on top of each other. At the same time, the superposition of the lenses on top of each other determines the gaps between the lenses.

It is to be noted that the light shielding plate 303 located between one lens and an adjacent lens is a flat annular light shielding member with an opening at the center of the annular light shielding member.

The diameter of the opening of the light shielding plate 303 is set at a minimum possible diameter that does not obstruct passage of a light flux B0 and a light flux B1. The light flux B0 is a flux of effective rays of light that become incident on the imaging lens 300 and collect on the optical axis X. The light flux B1 is a flux of effective rays of light incident that become incident on the imaging lens 300 from a maximum field angle and that collect to a maximum image height. Rays of light incident from positions outer than the light flux B1 are blocked by the light shielding plate 303. Thus, the light shielding plate 303 blocks unwanted light while permitting effective rays of light to pass through the light shielding plate 303.

FIG. 5 illustrates an embodiment in which the optical element 100 is applied to the fifth lens L5 among the first to sixth lenses L1 to L6 of the imaging lens 300.

Next, by referring to the embodiment illustrated in FIG. 5, description will be made with regard to how the optical element 100 attenuates the power of reflection light that can cause ghosting and flare.

Figure 6A:
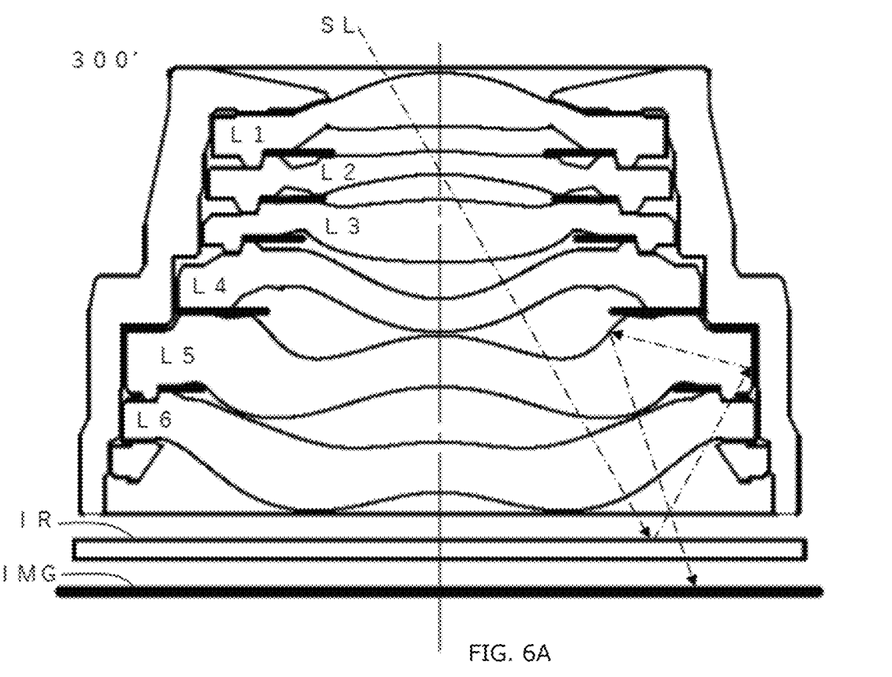
FIG. 6A illustrates unwanted light occurring in a conventional imaging lens.
Figure 6B:
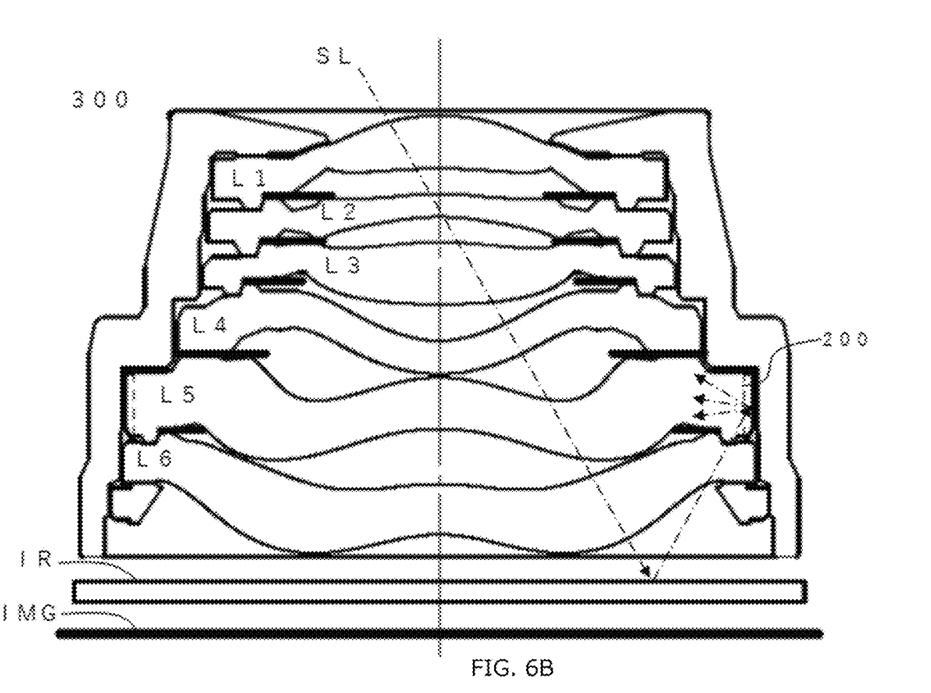
FIG. 6B illustrates unwanted light occurring in the embodiment illustrated in FIG. 5, in which the optical element according to the embodiment of the present invention is applied to an imaging lens.

FIG. 6A is a schematic illustrating a state in which unwanted light is occurring in a conventional imaging lens 300', and FIG. 6B is a schematic illustrating a state in which the imaging lens 300 illustrated in FIG. 5 restrains unwanted light.

As illustrated in FIG. 6A, the ray of light SL passes through the imaging lens 300'; is reflected by the upper surface of the filter IR; enters the edge of the sixth lens L6; passes through the portion of engagement between the sixth lens L6 and the fifth lens L5; is reflected by the outer surface of the fifth lens L5; is totally reflected by the effective diameter portion of the fifth lens L5; passes through the filter IR; and reaches the imaging element IMG.

The ray of light SL reaching the imaging element IMG appears in the photographed image in the form of ghosting and/or flare, to the detriment of image quality.

FIG. 6B illustrates an example in which the optical element 100 (according to the above-described embodiment of the present invention) is applied to the fifth lens L5 of the imaging lens 300' illustrated in FIG. 6A. Specifically, the roughened portions 200 are formed on the outer circumference surface 103 of the fifth lens L5 of the imaging lens 300'.

As illustrated in FIG. 6B, the ray of light SL passes through the imaging lens 300; is reflected by the upper surface of the filter IR; enters the edge of the sixth lens L6; passes through the portion of engagement between the sixth lens L6 and the fifth lens L5; becomes incident on the outer surface of 103 of the fifth lens L5; and is scattered by the roughened portions 200 of the outer circumference surface 103. This attenuates the power of the light incident on and reflected by the outer surface of the fifth lens L5.

Thus, the ray of light SL scattered by the roughened portions 200 of the outer surface of the fifth lens L5 has been attenuated in light power. This prevents the ray of light SL from being totally reflected by the effective diameter portion of the fifth lens L5 and reaching the imaging element IMG through the filter IR. This effectively restrains occurrence of ghosting and flare.

Figure 7A:
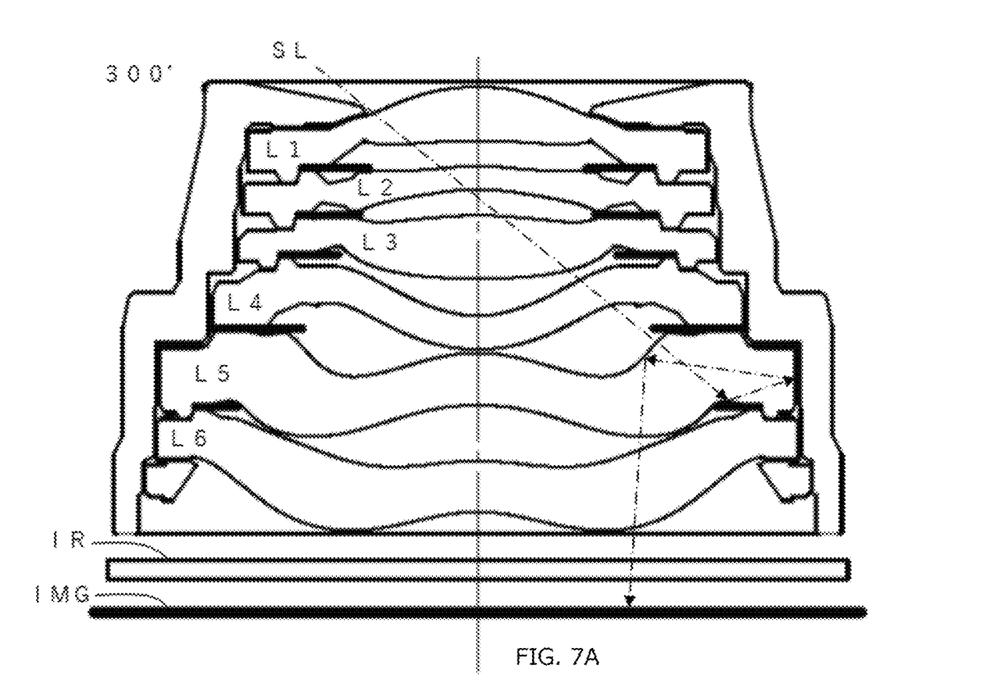
FIG. 7A illustrates unwanted light occurring in a conventional imaging lens.
Figure 7B:
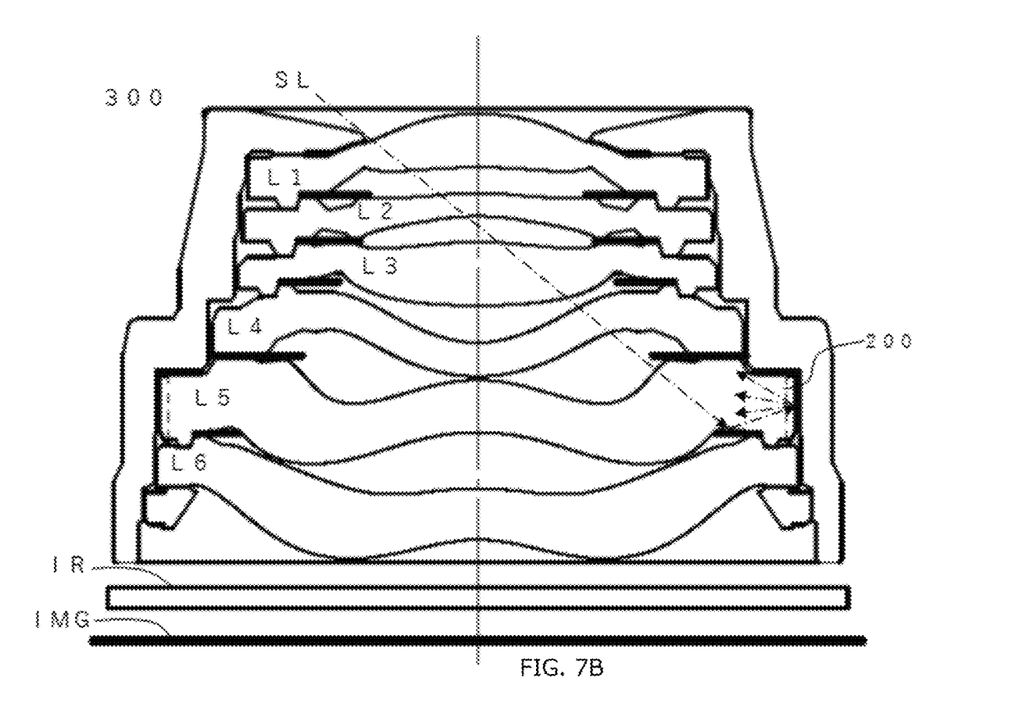
FIG. 7B illustrates unwanted light occurring in the embodiment illustrated in FIG. 5, in which the optical element according to the embodiment of the present invention is applied to an imaging lens.

FIG. 7A is a schematic illustrating a state in which unwanted light is occurring in the conventional imaging lens 300', and FIG. 7B is a schematic illustrating a state in which the imaging lens 300 illustrated in FIG. 5 restrains unwanted light.

As illustrated in FIG. 7A, unwanted light SL is reflected by a surface of the edge of the fifth lens L5 of the imaging lens 300'; is reflected by the outer circumference surface 103 of the fifth lens L5; is totally reflected by the effective diameter portion of the fifth lens L5; passes through the filter IR; and reaches the imaging element IMG. The ray of light SL reaching the imaging element IMG appears in the photographed image in the form of ghosting and/or flare, to the detriment of image quality.

FIG. 7B illustrates an example in which the optical element 100 (according to the above-described embodiment of the present invention) is applied to the fifth lens L5 of the imaging lens 300' illustrated in FIG. 7A. Specifically, the roughened portions 200 are formed on the outer circumference surface 103 of the fifth lens L5 of the imaging lens 300'.

As illustrated in FIG. 7B, the unwanted light SL is reflected by a surface of the edge of the fifth lens L5 of the imaging lens 300; becomes incident on the outer circumference surface 103 of the fifth lens L5; and is scattered by the roughened portions 200 of the outer circumference surface 103. This attenuates the power of the light incident on and reflected by the outer surface of the fifth lens L5.

Thus, the unwanted light SL scattered by the roughened portions 200 of the outer surface of the fifth lens L5 has been attenuated in light power. This prevents the unwanted light SL from being totally reflected by the effective diameter portion of the fifth lens L5 and reaching the imaging element IMG through the filter IR. This effectively restrains occurrence of ghosting and flare.

As has been described hereinbefore, in the optical element according to the embodiment of the present invention and in the imaging lens using the optical element, roughened portions to restrain unwanted light are formed on the outer surface of the edge around the optical effective portion. This effectively restrains occurrence of ghosting and flare.

In the above description, the optical element according to the embodiment of the present invention is applied to the fifth lens of an imaging lens made up of six lenses. This configuration, however, is not intended in a limiting sense; the optical element may be applied to any other portion of an imaging lens where it is necessary to restrain light reflection on the outer circumference of the optical element.

It is also possible to apply the optical element according to the embodiment of the present invention to a plurality of lenses of an imaging lens, or to an imaging lens made up of a single optical element.

Obviously, numerous modifications and variations of the present invention are possible in light of the above teachings. It is therefore to be understood that within the scope of the appended claims, the present invention may be practiced otherwise than as specifically described herein.

INDUSTRIAL APPLICABILITY

The embodiments of the present invention effectively restrain light reflection in optical elements, and, when applied to imaging devices requiring high image quality, contribute to improvement of optical performance and quality of the imaging devices.

DESCRIPTION OF REFERENCE NUMERAL

100 Optical element
101 Optical effective portion (lens portion)
102 Edge
103 Outer circumference surface
200 Roughened portion
300, 300' Imaging lens
301 Lens assembly
302 Barrel
303 Light shielding plate
304 Rear light-shielding ring
L1 First lens
L2 Second lens
L3 Third lens
L4 Fourth lens
L5 Fifth lens
L6 Sixth lens
L1b, L2a, L2b, L3a, L3b, L4a, L5b, L6a Lens engagement portion
L1a, L1c, L6c, 302a, 302b, 303c Barrel engagement portion
B0 Effective light flux on optical axis
B1 Effective light flux at maximum image height
SL Ray of light, unwanted light
X Optical axis
IR Filter
IMG Imaging device

What is claimed is:

1. An optical element comprising:
   an optical effective portion; and
   an edge located around the optical effective portion and having an outer circumference surface, the outer circumference surface comprising a roughened portion, wherein
   the roughened portion protrudes in a radial direction directed from an optical axis of the optical element toward the outer circumference surface, and has a protrusion height of equal to or more than 0.01 mm.

2. The optical element according to claim 1, wherein the roughened portion has a unit shape defined by a protrusion and a depression, and the roughened portion comprises a repetition of equal to or more than ten of the protrusion-depression unit shapes.

3. An imaging lens comprising the optical element according to claim 2.

4. The optical element according to claim 1, wherein the roughened portion comprises a depression and a protrusion, the depression or the protrusion extending in an extension direction in which the optical axis extends, the extension direction being parallel to the optical axis.

5. An imaging lens comprising the optical element according to claim 4.

6. The optical element according to claim 1, wherein the roughened portion comprises a depression and a protrusion, the depression or the protrusion extending in an extension direction in which the optical axis extends, the extension direction having an angle relative to the optical axis.

7. An imaging lens comprising the optical element according to claim 6.

8. The optical element according to claim 1, wherein the roughened portion has a continuous shape extending over the outer circumference surface.

9. An imaging lens comprising the optical element according to claim 8.

10. The optical element according to claim 1, wherein the roughened portion comprises an arcuate depression and an arcuate protrusion each having a radius of equal to or more than 0.03 mm.

11. An imaging lens comprising the optical element according to claim 1.

\* \* \* \* \*